(12) United States Patent
Ferguson et al.

(10) Patent No.: US 7,895,101 B1
(45) Date of Patent: Feb. 22, 2011

(54) COMPUTER BASED METHOD OF PRICING EQUITY INDEXED ANNUITY PRODUCT WITH LOCK-IN

(75) Inventors: Derek Ferguson, Erin (CA); Richard Kado, Oakville (CA); John Adam Rose, Toronto (CA); Marc Verrier, Caledon (CA)

(73) Assignee: Genesis Financial Products, Inc., Ontario (CA)

( * ) Notice: Subject to any disclaimer, the term of this patent is extended or adjusted under 35 U.S.C. 154(b) by 263 days.

(21) Appl. No.: 11/652,807

(22) Filed: Jan. 12, 2007

Related U.S. Application Data

(60) Provisional application No. 60/758,787, filed on Jan. 13, 2006.

(51) Int. Cl.
*G06Q 40/10* (2006.01)
(52) U.S. Cl. ........................................................ 705/35
(58) Field of Classification Search .................... 705/35
See application file for complete search history.

(56) References Cited

U.S. PATENT DOCUMENTS

2006/0015429 A1* 1/2006 Sullivan et al. ............... 705/35

2007/0100726 A1* 5/2007 O'Flinn et al. ............ 705/36 R

OTHER PUBLICATIONS

Moshe Milvesky, The Journal of Risk and Insurance, vol. 65, No. 3 Sep. 1998, pp. 401-426.*

* cited by examiner

*Primary Examiner*—Kirsten S Apple
*Assistant Examiner*—Abdul Basit
(74) *Attorney, Agent, or Firm*—McDonnell Boehnen Hulbert & Berghoff LLP

(57) ABSTRACT

The present invention broadly comprises a computer-based method for determining a set of equity-indexed crediting parameters C for a selectable-term equity-indexed deposit product also having a set of profitability requirements R, a principal amount P, an account value A, a maximum term T, a set of lock-in formulas F, a selected term T', an immediate credit I, and a guaranteed rate G, with R, P, A, T, C, and F determined at the time of product purchase and T'<=T determined by the purchaser after the time of purchase and I and G determined by the seller at T' according to the set of formulas F, with the immediate credit I being added to the account value A at time T' and interest being credited to the account value A at the rate G from time T' to time T.

25 Claims, No Drawings

COMPUTER BASED METHOD OF PRICING EQUITY INDEXED ANNUITY PRODUCT WITH LOCK-IN

CROSS-REFERENCE TO RELATED APPLICATIONS

This application claims the benefit under 35 U.S.C. §119(e) of U.S. Provisional Application No. 60/758,787 filed Jan. 13, 2006.

REFERENCE TO COMPUTER PROGRAM LISTING/TABLE APPENDIX

The present application includes a computer program listing appendix on compact disc. Two identical compact discs are provided herewith. Each compact disc contains an ASCII text file of the computer program listing as follows:

| Filename: | apl.lst |
|---|---|
| Size: | 5,903,224 bytes |
| Date Created: | Jan. 11, 2006 |
| Filename: | LMM1.DPR |
| Size: | 38,517 bytes |
| Date Created: | Jan. 11, 2006 |
| Filename: | Rmem4p.dpr |
| Size: | 29,371 bytes |
| Date Created: | Jan. 11, 2006 |
| Filename: | SIMPLX.CPP |
| Size: | 4,445 bytes |
| Date Created: | Jan. 11, 2006 |

The computer program listing appendix is hereby expressly incorporated by reference in the present application.

FIELD OF THE INVENTION

The present invention relates to an equity indexed annuity with a simple and clear structure which enables an investor to capitalize on the rewards of indexing while providing access to funds without onerous clawbacks of accrued index benefits.

BACKGROUND OF THE INVENTION

According to AARP's Survey of Consumer Finance, 54% of Baby Boomers do not want any risk associated with their investments. This aversion to risk is the primary reason why hybrid products, those offering a combination of upside potential while providing downside protection, have flourished over the last decade.

Financial planners often use a concept called "Capital Preservation." A portion of the client's principal is invested with guaranteed fixed interest sufficient to grow back to the original principal at the end of the desired investment horizon. This guarantees that the client will get their principal at that time. The remainder is invested in equity markets, providing the potential for excess return. Unfortunately, with today's low interest rates, an investor needs to put almost all the money in fixed interest, leaving very little in stocks. For example, if a client has $100,000 to invest over a 4-year time horizon, and earns a 4-year guaranteed rate of 4%, then they must put $85,480 in fixed interest, leaving only $15,520 invested in equities. In other words, less than 16% of funds reflect equity market performance. As a result, the Capital Preservation concept is no longer workable in its traditional format.

Thus, there is a long-felt need for hybrid products, such as the Equity Indexed Annuity, with reduced complexity and increased benefits and flexibility.

BRIEF SUMMARY OF THE INVENTION

The Balance Plus Annuity (BPA) is founded on a simple concept and provides a clear structure that highlights the potential rewards of indexing while providing access to funds without onerous penalties and clawbacks of accrued index benefits. There is no product on the market with the features incorporated in BPA. The Balanced Plus Annuity takes these advantages and adds a level of flexibility and control that currently doesn't exist making it one of the most consumer friendly products on the market today.

BPA incorporates a unique balanced allocation of earnings that capitalizes on the well established time proven balanced allocation strategies. This crediting rate strategy eliminates the modifiers that add complexity and limit growth. In addition, BPA has unique liquidity features and death benefits. This balanced approach and combination of benefits sets it apart from any other EIA in the market place today. The product has indexing terms of 4 years. Key features and benefits of BPA include: principal guarantee, less early withdrawal charges; minimum guaranteed earnings; simple balanced allocation strategy offering the opportunity for index growth without complicated formulas and modifiers; lock-in privilege that can be triggered at any time; and a unique rollup death benefit enhancement rider.

The present invention broadly comprises a computer-based method for determining a set of equity-indexed crediting parameters C for a selectable-term equity-indexed deposit product also having a set of profitability requirements R, a principal amount P, an account value A, a maximum term T, a set of lock-in formulas F, a selected term T', an immediate credit I, and a guaranteed rate G, with R, P, A, T, C, and F determined at the time of product purchase and T'<=T determined by the purchaser after the time of purchase and I and G determined by the seller at T' according to the set of formulas F, with the immediate credit I being added to the account value A at time T' and interest being credited to the account value A at the rate G from time T' to time T. The method: generates a set of yield curve and equity index scenarios consistent with valuation parameters; generates a set of values for T', one for each scenario; sets a trial value $C_i$ for C for the product; calculates values for I and G for each scenario; calculates the observed distribution D of profitability using the scenarios; compares D with R; and computes a revised trial value $C_{i+1}$ for C for the product.

In some aspects, the method specifies a point-to-point equity index credit by the set of equity-indexed crediting parameters C and calculates the equity index credit using a percentage of an increase in an equity index, credited at the end of each policy year such that the equity index credit is no less than an annual minimum value. By policy year, we mean a policy year for a present invention product.

In some aspects, the method specifies a point-to-point equity index credit by the set of equity-indexed crediting parameters C and calculates the equity index credit using a percentage of an increase in an equity index, credited at the end of each policy year such that the equity index credit is no less than an annual minimum value and the equity index credit is no greater than an annual maximum value.

In some aspects, the method specifies a point-to-average equity index credit by the set of equity-indexed crediting parameters C and calculates the equity index credit using a percentage of an increase in an equity index from a year-start value to an average of values over a policy year, credited at the end of each policy year such that the equity index credit is no less than an annual minimum value.

In some aspects, the method specifies a point-to-average equity index credit by the set of equity-indexed crediting parameters C and calculates the equity index credit using a percentage of an increase in an equity index from a year-start value to an average of values over a policy year, credited at the end of each policy year such that the equity index credit is no less than an annual minimum value and the equity index credit is no greater than an annual maximum value.

In some aspects, the method specifies a point-to-point equity index credit by the set of equity-indexed crediting parameters C and calculates the equity index credit using a percentage of an increase in an equity index, credited at the end of an index interval equal to an integral number N of policy years such that the equity index credit is no less than a minimum value calculated during the index interval.

In some aspects, the method specifies a point-to-point equity index credit by the set of equity-indexed crediting parameters C and calculates the equity index credit using a percentage of an increase in an equity index, credited at the end of an index interval equal to an integral number N of policy years such that the equity index credit is no less than a minimum value and the equity index credit is no greater than a maximum value calculated during the index interval.

In some aspects, the method specifies a point-to-average equity index credit by the set of equity-indexed crediting parameters C and calculates the equity index credit using a percentage of an increase in an equity index from a starting value to an average of values over an index interval equal to an integral number N of policy years, credited at the end of the index interval such that the equity index credit is no less than a minimum value calculated during the index interval.

In some aspects, the method specifies a point-to-average equity index credit by the set of equity-indexed crediting parameters C and calculates the equity index credit using a percentage of increase in an equity index from a starting value to an average of values over an index interval equal to an integral number N of policy years, credited at the end of the index interval such that the equity index credit is no less than a minimum value and the equity index credit is no greater than a maximum value calculated during the index interval.

In some aspects, the method specifies a point-to-point equity index credit by the set of equity-indexed crediting parameters C and calculates the equity index credit using a weighted sum, the weighted sum adding a compounded value calculated using a declared rate to a percentage of change in an equity index, such that the equity index credit is credited at the end of an index interval equal to an integral number N of policy years and the equity index credit is no less than a minimum value during the index interval.

In some aspects, the method specifies a point-to-point equity index credit by the set of equity-indexed crediting parameters C and calculating the credit using a weighted sum, the weighted sum adding a compounded value calculated using a declared rate to a percentage of change in an equity index, such that the equity index credit is credited at the end of an index interval equal to an integral number N of policy years, the equity index credit is no less than a minimum value, and the equity index credit is no greater than a maximum value during the index interval.

In some aspects, the method specifies a point-to-average equity index credit by the set of equity-indexed crediting parameters C and calculates the credit using a weighted sum, the weighted sum adding a compounded value calculated using a declared rate to a percentage of change in an equity index from a starting value to an average of values over an index interval equal to an integral number N of policy years such that the equity index credit is credited at the end of the index interval, and the credit is no less than a minimum value during the index interval.

In some aspects, the method specifies a point-to-average equity index credit by the set of equity-indexed crediting parameters C and calculates the equity index credit using a weighted sum, the weighted sum adding a compounded value calculated using a declared rate to a percentage of change in an equity index from a starting value to an average of values over an index interval equal to an integral number N of policy years such that the equity index credit is credited at the end of the index interval, the equity index credit is no less than a minimum value, and the equity index credit is no greater than a maximum value during the index interval.

DETAILED DESCRIPTION OF THE INVENTION

Balance Plus Annuity (BPA) is an equity indexed annuity (EIA) which improves on the capital preservation concept by consolidating the fixed interest and equity indexed portions into a single product, and providing the principal guarantee for the product rather than for each portion of the product. BPA also is referred to as "the policy" or "the product" in the description that follows. The resulting product allows 35-40% of assets to reflect equity market performance (versus 16% in a classic Capital Preservation plan) while still guaranteeing a return of principal at the end of the time horizon.

In order to maximize potential client growth, in some aspects, BPA has a 12 or 8 year Withdrawal Charge and within that Withdrawal Charge time span, a series of 4 year point-to-point indexing terms (the "Term"). It should be understood that the present invention is not limited to the preceding Withdrawal Charge time spans and Terms and that other Withdrawal Charge time spans and Terms are included in the spirit and scope of the claimed invention. In order to provide additional flexibility similar to that found in other Capital Preservation plans, BPA provides a unique early lock-in privilege which allows clients to lock-in their gains at any time during a four year indexing interval and stop any exposure to any changes in the equity index after that time. As well, this feature allows policy owners to surrender prior to the end of any Term without forgoing all earnings like all other point to point EIAs. Instead, policyholders receive a pro-rata portion of any gains in the policy at the time of surrender.

To round out the picture, BPA offers an enhanced minimum guaranteed death benefit rider, which guarantees that the death benefit will be no less than the original premium accumulated with interest up to age 90 (the death benefit is adjusted for withdrawals).

BPA is an equity indexed single premium deferred annuity. Issue ages are 0-85 for the 8-year version Withdrawal Charge version, and 0-80 for the 12-year Withdrawal Charge version. Any associated rates, multipliers, factors, etc., are treated as variables, which can change for different issue dates. It should be understood that the present invention is not limited to any particular variable or any particular respective values for variables.

A Balanced Allocation Strategy is used to describe the interest crediting methodology. Interest is based on a blend of an equity index and declared rate earnings. The equity index allocation is based on the Standard & Poor's 500 Index (S&P 500 Index), and the Declared Rate allocation is based on the Declared Rate which is determined at the beginning of each Term.

When the premium is paid, the Calculation Factors for the initial Term are declared; these factors are guaranteed for the entire Term. The Calculation Factors specify how the capital preservation concept is applied in the upcoming Term. In particular, the following are declared: the Equity Indexed Allocation Percentage; the Declared Rate Allocation Percentage (together 100%); the Declared Rate; and the Asset Expense Charge Rate. It should be understood that the present invention is not limited to the preceding factors and that other factors are included in the spirit and scope of the claim.

Gains accrued during the Term are credited to the Accumulation Value at the end of the Term. At that time, the sum of the declared rate earnings and equity market gain/loss participation, subject to a floor of zero on the sum, is applied to the Accumulation Value. However, at any time during the Term, clients can elect to trigger the Lock-in Date and "lock in" of their combined gains.

If the policy owner elects an early lock-in, they are immediately credited with the Index Earnings. The Index Earnings is equal to the sum of the declared rate earnings to date, and a pro-rata portion of the then-calculated equity index gain/loss, subject to a floor of zero on the sum. For the rest of the term, the policy receives Guaranteed Interest earnings which are equal to the sum of the declared rate applied to the Declared Rate Allocation, and daily installments of the remaining index gains that were not credited on the Lock-in Date. This combination is expressed as a single guaranteed interest rate that is credited from lock-in to the end of the Term. After the end of each Term, a new 4-year Term begins and new Calculation Factors for that Term are declared.

The Cash Surrender Value is equal to the greater of (a) the Accumulation Value adjusted for a market value adjustment (MVA) and less a Withdrawal Charge, or (b) the Minimum Guaranteed Contract Value. The Minimum Guaranteed Contract Value is 87.5% of the single premium less withdrawals accumulated with interest. In some aspects, the company administering the BPA sets the nonforfeiture interest rate for BPA in the same manner as other EIA products offered by the company. Hereinafter, 'the company' refers to the company administering BPA.

A rider to enhance the death benefit is available for each Withdrawal Charge time span available for the BPA. For example, the rider provides a guaranteed minimum death benefit equal to the premium rolled up at 5% for the 12 year design and 4% for the 8 year design. The rider premium is deducted from policy earnings at the time the earnings are credited to the policy, but cannot exceed the earnings.

For example purposes we will use the following sample Calculation Factors for a first Term: 40% Equity Indexed Allocation for the 12-year product and 35% for the 8-year product; 60% Declared Rate Allocation for the 12-year product and 65% for the 8-year product; and for both products, the declared rate is 1.95%. The Asset Expense Charge Rate is 0%. An initial launch rate of 0% is expected, however it should be understood that the launch rate may change at some point in the future for new issues.

The policy form defines Term as "the length of time for which interest on the Accumulation Value is calculated based on a particular set of Calculation Factors." Each successive Term begins at the end of the immediately preceding Term, and a new set of Calculation Factors is declared at that time. The current design uses four-year terms. During each four year Term, the Accumulation Value stays level until the end of that Term, unless the client requests an early lock-in before the end of that Term. The starting Accumulation Value for the first Term is equal to the Premium (less any premium tax if deducted at issue). The starting Accumulation Value for the second Term equals the premium, less any withdrawals, plus any earnings credited during the first Term.

Clients can elect an early lock-in of the Index Earnings at any time during the Term. If an early lock-in is elected by the policy owner, then the Index Earnings are added to the Accumulation Value at the time of the early lock-in. The Index Earnings are equal to the sum of the declared rate earnings to date, and a pro-rata portion of the then-calculated equity index gain/loss, subject to a floor of zero on that sum. From the time of the early lock-in until the end of the Term, the account functions like a standard fixed SPDA with one exception: the interest rate is unique to each situation and is calculated at the time of early lock-in. During this time period, withdrawals impact the Accumulation Value in the same manner as they impact the Accumulation Value for a standard SPDA. After the Withdrawal Charge period, the Accumulation Value grows with ongoing 4 year Terms.

BPA provides a balance of earnings consisting of a declared rate component and an equity indexed component. The allocation between the two components, as well as the declared rate, is set as part of the normal rate setting process. The declared rate is guaranteed for the full four year Term. New factors are set at the start of each subsequent Term (and guaranteed for that term).

The following formula (hereafter referred to as 'the Formula') is used for calculating the Index Earnings Factor and the Balanced Allocation Factor which in turn are used in the following calculations: for normal earnings crediting at the end of the four year term if the client did not elect a lock-in during the Term; for calculating the immediate credit upon a client requested lock-in as well as calculating the interest earnings credited after lock-in; for any death benefit calculation; and for calculating the Balanced Allocation Value. The formula equals the sum of the combined earnings (A plus B) minus any charges (C plus D), but not less than zero. (A) is equal to the product of the following: the Equity Indexed Allocation Percentage declared at the start of the Term; the change in the S&P index (measured by comparing the index value on the start of the Term to the Ending Index Value, defined below, on the Lock-in Date); and the Pro-Rata Factor for that date, as defined below. (B) is equal to the product of the following: the Declared Rate Allocation Percentage declared at the start of the Term; and the Declared Rate compounded from the start of the Term to the Lock-in Date (i.e. $(1+0.0195)^t - 1$ where t is the Elapsed Term). (C) is equal to the product of the following: the annual percentage cost of any rider attached to the policy; and the elapsed time in the current Term. The elapsed time for the rider charge is expressed in years with a fraction for partial years. The elapsed time is the lesser of (a) the Elapsed Term or (b) the rider elapsed time from the start of the Term to Rider Premium Completion Date. (D) is equal to the product of the following: the Asset Expense Charge Rate declared at the start of the Term; and the Elapsed Term.

In the Formula, item A is allowed to be negative. However, the total value (A+B−C−D) is never allowed to be less than zero. For this calculation, the Equity Indexed Ending Value is defined as follows: at the end of the Term, the Equity Index Ending Value is the average of the S&P 500 values published during the last 30 calendar days of the Term.

On any other date during a term (the date of death, the date for determining the Balanced Allocation Value, or upon lock-in prior to the end of the Term), the Equity Index Ending Value is equal to the S&P Value on that day (or if the index is not published that day then the most recently published index value).

The only difference between the Balanced Allocation Value and the Index Earnings Factor is the way that the Pro-rata factor is defined in item A of the Formula: In calculating the Index Earnings Factor, the Pro-Rata Factor is the time since the start of the term divided by the total length of the term. The measurement of time should be in actual days gone divided by actual days in the term (i.e. taking leap years into account). In calculating the Balanced Allocation Factor, the Pro-rata factor is set equal to one. At lock-in the Balanced Allocation Factor is set equal to zero. This allows the use of the same Free Partial Withdrawal (FPW) formula after lock-in.

The Balanced Allocation Factor and the Balanced Allocation Value are terms defined in the policy form to help explain earnings, FPW and death benefit calculations. The Balanced Allocation Value is included on each anniversary statement and thus provides the policy holder lock-in information as of the last policy anniversary.

The Balanced Allocation Value is equal to the Accumulation Value times the Balanced Allocation Factor. The preceding definition results in the following values being used in the Formula.

| | |
|---|---|
| Lock-in Date | The date for which the Balanced Allocation Value is being calculated |
| Elapsed Term | The time elapsed from the start of the current index term to the Lock-in Date. The elapsed time is expressed as years with fractional amounts |
| Pro-Rata Factor | One |
| Equity Index Ending Value | The S&P Index value published on the date for which the Balanced Allocation Value is being calculated. In some aspects, the Balanced Allocation Value is calculated at the end of the term using the average of the index values published during the last 30 days. |

If lock-in is not elected during a Term, then at the end of the Term the combined earnings equal the Accumulation Value at the end of the term times the Index Earnings Factor. The preceding definition result in the following values being used in the Formula.

| | |
|---|---|
| Lock-in Date | Policy anniversary at the end of the Term |
| Elapsed Term | Four years |
| Pro-Rata Factor | One |
| Equity Index Ending Value | Average of the index values published during the last 30 calendar days of the term |

In the situation where the client elects to lock in their gains during a Term, the interest credited to the Accumulation Value is equal to: first, the Index Earnings which are credited immediately on the Lock-in Date; and second, the guaranteed interest rate (g) credited from the Lock-in Date until the end of the Term.

The immediate credit is equal to the Accumulation Value on the early lock-in date times the Index Earnings Factor. The preceding definition results in the following values being used in the Formula.

| | |
|---|---|
| Lock-in Date | The date the owner's lock-in request was received in good order at home office |
| Elapsed Term (for use in calculating pro-rata factor and items B, C and D] | The time elapsed from the start of the current index term to the Lock-in Date. The elapsed time is expressed as years with fractional amounts |
| Pro-Rata Factor | The Elapsed Term divided by four |
| Equity Index Ending Value | The S&P Index value published on the Lock-in Date |

Between the lock-in date and the end of the Term, the Accumulation Value acts like a regular SPDA and earns daily interest at the "guaranteed rate." The guaranteed rate is calculated at the time of lock-in and is guaranteed for the remainder of the Term. This guaranteed rate can be different for each policy that elects to lock-in.

The guaranteed rate is determined so that at the end of the Term, the Accumulation Value equals a target accumulation value. From a marketing viewpoint, this target accumulation value can be thought of as: the Accumulation Value immediately prior to lock-in, plus the equity indexed allocation earnings (without any pro-rata adjustment) calculated at lock-in, plus declared rate allocation earnings for the entire Term, minus any rider charges or asset expense charges.

The preceding target accumulation value is equal to the Accumulation Value immediately prior to lock-in times 1 plus the Index Earnings Factor with the following values in the Formula.

| | |
|---|---|
| Lock-in Date | The date the owner's lock-in request was received in good order at home office |
| Elapsed Term | Four years |
| Pro-Rata Factor | One |
| Equity Index Ending Value | The S&P Index value published on the Lock-in Date |

The present invention solves for the guaranteed rate, g, such that the following formulas provide the same result. That is, the following two formulas must have the same value:

$$(AV_t \times (1+A_t+B_{end\ of\ term}-C_{end\ of\ term}-D_{end\ of\ term}))$$

$$(AV_t \times (1+A_t+B_t-C_t-D_t)) \times (1+g)^{RT}$$

In the above formulas t is the time of lock-in, and items A, B, C and D are as defined above. A is the equity indexed allocation earnings calculated at the time indicated and using the appropriate pro-rata factor for that time; B is the declared rate allocation earnings; C is the rider premium charge; D is the Asset Expense Charge; and RT is the time remaining in the Term.

Therefore g is equal to:

$$g=[(1+A_t+B_{end\ of\ term}-C_{end\ of\ term}-D_{end\ of\ term})/(1+A_t+B_t-C_t-D_t)]^{(1/RT)}-1$$

Note that the annual rider premium is multiplied by the elapsed time indicated in the above formula ($C_{end\ of\ term}$ equals the annual rider premium rate times the elapsed time). This time period has to be tested such that it does not exceed the Rider Premium Completion Date as described above.

At the time of an early lock-in, the client receives a confirmation statement informing them of their guaranteed rate for the rest of the term. This confirmation includes at least the following items: amount of earnings credited to the Accumulation Value on the lock-in date, resulting new Accumulation Value, and Interest rate for the remainder of the term. In some aspects, a confirmation includes more information and follows the layout of the annual statement.

The table below summarizes the various values (column headers).

|  | Equity Index Ending Value (used for A) | Elapsed Term (used for B, C and D) | Prorata Factor (used for A) |
|---|---|---|---|
| At Term End if no prior lock-in | | | |
| For use in Index Earnings Factor | Average of S&P Values on business days during last 30 days | Defined as Actual number of years including fractions between term start and Lock-in Date. At the end of term this will be 4 years for the current designs | Defined as Elapsed Term/4. At the end of term this will be 1 for the current designs |
| For use in Balanced Allocation Factor | Balanced Allocation Factor equals 0 | N/A | N/A |
| On any other date "D" if no prior lock-in | | | |
| For use in Index Earnings Factor | S&P Index Value for date "D" | Defined as Actual number of years including fractions between term start and Lock-in Date | Defined as Elapsed Term divided by the total term (4 years for the current design) |
| For use in Balanced Allocation Factor | S&P Index Value for date "D" | Defined as actual number of years including fractions between term start and Lock-in Date | Defined to be 1 |
| For use in end-of-term index earnings factor (this is used in calculation of g) | S&P Index Value for date "D" | Defined to be the number of years of the term. This is 4 years for the current design | Defined to be 1 |
| On any other date if prior lock-in | | | |
| For use in Balanced Allocation Factor For use in Index Earnings Factor | Balanced Allocation Factor equals 0 Index Earnings Factor not used | | |

After the end of the Withdrawal Charge period, the four year Terms continue. The policy form allows for expense charges. The initial product has expense charges set to zero for all Terms. However, it should be understood that other expense charges are possible. In some aspects, the index used in the BPA is the S&P 500 Composite Price Index. However, it should be understood that the policy form provides the flexibility of using a different index.

The index value used on any given policy anniversary is the value of the index on the close of business on that date. If the policy anniversary falls on a day that the index is not published (weekend or holiday) then the most recently published index value is used.

Note that the lock-in provision can be triggered by the client on any date. Thus, the system has the ability to reference the index value on dates other than policy anniversaries. If the home office processing date falls on a date that the index is not published then the most recently published index value is used.

The percentage change of the S&P index is measured by comparing the S&P index at the start of the Term to the Equity Index Ending Value. At the end of the Term, the Equity Index Ending Value is the average of the S&P 500 values published during the last 30 calendar days of the Term.

On any other date (i.e. for death benefits, for determining the Balanced Allocation Value, or upon lock-in prior to the end of the Term), the Equity Index Ending Value is equal to the S&P Value on that day (or if the index is not published that day then the most recently published index value).

Note that the percentage change can be a negative number. Thus negative equity indexed allocation earnings can erode any declared rate allocation earnings but they can not erode principal since the combined earnings can never be less than zero.

The Cash Surrender Value is the greater of (a) the Minimum Guaranteed Contract Value and (b) the Accumulation Value modified by the market value adjustment less a Withdrawal Charge. However, the Withdrawal Charge and Market Value Adjustment (MVA) are waived on payments to the client equal to up to 10% of the Accumulation Value surrendered each year. Up to this limit, the amount withdrawn from the Accumulation Value is less than the amount paid to the client. For any withdrawals in excess of the amount paid to the client, there is a Withdrawal Charge and MVA.

In some aspects, for the 12-year design, the Withdrawal Charge scale is: 13.5, 13, 12.5, 12, 11, 10, 9, 8, 7, 6, 5, 3, 0% of the amount withdrawn in excess of the free withdrawal amount. However, it should be understood that the present invention is not limited to the preceding scale and that other scales are included in the spirit and scope of the claimed invention.

In some aspects, for the 8-year design, the Withdrawal Charge scale is: 10, 9, 8, 7, 6, 5, 4, 3, 0% of amount withdrawn in excess of the free withdrawal amount. It should be understood that other schedules are possible for the 8 and 12 year designs.

If a client does a full surrender before lock-in the policy is locked-in before proceeding with the surrender. This raises the question of whether the FPW should be done before or after lock-in. Depending on the change in the S&P index, either method can generate better results. To ensure the best possible result for the client, the calculation is done on both methods with the better method selected for each request.

The BPA confinement and terminal illness provision allows 100% of the Accumulation Value to be depleted without any Withdrawal Charge or MVA. Note that this means, assuming no prior lock-in, that if the client withdraws all available funds then the cash received will equal 100% of the Balanced Allocation Value.

A market value adjustment applies on surrenders in excess of a free partial withdrawal limit. It does not apply to the Minimum Guaranteed Contract Value. The formula is described below.

The MVA is calculated as follows: $50\% \times (a-b) \times n/12$

"a" is the 10-year Treasury Rate at issue.

"b" is the 10-year Treasury Rate published on the day before the surrender or withdrawal is processed plus 0.25%

"n" is the number of complete contract months remaining until the end of the withdrawal charge period. Any positive MVA cannot exceed the Withdrawal Charge. Any negative MVA cannot exceed the interest paid to date.

The Minimum Guaranteed Contract Value is a secondary guarantee that defines the minimum Cash Surrender Value and death benefit for the policy. The initial Minimum Guaranteed Contract Value is 87.5% of the single premium. The Minimum Guaranteed Contract Value is accumulated at the minimum guaranteed Interest Rate.

Any partial withdrawals reduce the Minimum Guaranteed Contract Value by the amount paid to the policyholder. Note that the deduction is the "amount paid"; this can be different from the amount deducted from the Accumulation Value in many ways. For free withdrawals, the deduction from Accumulation Value is always less than or equal to the amount paid to the policyholder as described above.

For non-free withdrawals, the amount paid is equal to the amount deducted from the Accumulation Value, less any Withdrawal Charges and after applying any MVAs (i.e. the amount paid is reduced by any negative MVAs and increased by any positive MVAs). There is no top-up of the Minimum Guaranteed Contract Value.

The initial Accumulation Value is the single premium. In some aspects, applicable state premium taxes are not deducted at issue. The Accumulation Value earns interest as described previously.

The Accumulation Value is decreased by any partial surrenders, including any applicable Withdrawal Charges and MVA. However, in the case of a free withdrawal, the decrease in the Accumulation Value is less than the amount paid to the client, as described above.

As with typical current policies, the death benefit is paid upon receipt of proof of death of the annuitant. The death benefit is the greatest of (a) the Cash Surrender Value reflecting any market value adjustment, and (b) the Balanced Allocation Value ignoring any Withdrawal Charge or market value adjustment, as of the date of receipt of proof of death.

The death benefit is paid on the death of the annuitant. If the beneficiary of the death benefit is a spouse of the annuitant then no death benefit is paid and the spouse continues the policy.

This rider can be elected by the policyowner at issue. The rider can not be dropped once elected. On death of the annuitant, the beneficiary receives the greater of actual death benefit under the annuity and the Enhanced Guaranteed Minimum Death Benefit. The enhanced death benefit is equal to the premium accumulated at an interest rate that is set at issue. The premium is accumulated at that interest rate until the Completion Date, and it is adjusted for any withdrawals. This type of death benefit rider is normally found with Variable Annuity (VA) products and is generally referred to as a Rollup Death Benefit.

At issue the enhanced death benefit is equal to the premium paid. Thereafter it increases at the stated interest rate until the completion date. In some aspects, the rollup interest rate is 4% for the 8 year design and 5% for the 12 year design. In some aspects, the roll up completion date is the policy anniversary following the annuitant's 90th birthday. Although the death benefit stops increasing after the completion date it is still paid out after that date if it is higher than the regular annuity death benefit at the date of death.

The rider premium is guaranteed at the rate set at issue. In some aspects, the rate is 0.50% per year. The premium is payable until the completion date (the policy anniversary following the annuitant's 90th birthday). The premium is charged at the same time that interest is credited to the Accumulation Value. The rider premium can not exceed the amount of interest credited; therefore any portion of the rider premium in excess of the amount of interest credit is waived. The treatment of rider premiums is contained in the formulas for the Indexed Earnings factor and the Balanced Allocation Factor described above. A text explanation of those formulas is as follows:

If a client does not elect lock-in during a Term, then at the end of the Term, the interest credit is reduced by the Accumulation Value times 0.50% multiplied by the lesser of (a) the number of years in the Term or (b) the number of years between the start of the Term and the Rider Premium Completion Date. However, the resulting credit cannot be less than zero.

If a client elects lock-in during a Term, then at that time, the resulting credit is reduced by 0.50% times the lesser of (a) the number of full years plus a fraction for the partial year since the start of the Term and (b) the time between the start of the Term and the Rider Premium Completion Date. At lock-in the guaranteed rate g is calculated as described previously. The formula for this rate automatically adjusts for any outstanding rider premiums.

The Enhanced Death Benefit is adjusted for any withdrawals. At the time a withdrawal is made, it is multiplied by an adjustment factor equal to (a) divided by (b) where: (a) is the Accumulation Value immediately after the partial withdrawal and (b) is the Accumulation Value immediately prior to the partial withdrawal.

BPA includes the usual "persons" found within a deferred annuity contract. The contract is annuitant driven not owner driven. This includes: (a) Annuitant—the life that is being used to measure the starting date of annuity income payments; the death benefit is paid on the death of the annuitant; Joint Annuitants are permitted; the Annuitant(s) can not be changed after issue. (b) Payee—the person to receive the annuity income—this is always the annuitant. (c) Owner—there may be multiple owners (primary, secondary, joint). (d) Beneficiary—there may be multiple beneficiaries (primary, secondary, multiple).

The minimum age is zero. The maximum issue age for the annuitant is age 85 for the policy with an 8 year Withdrawal Charge period and age 80 for the policy with a 12 year Withdrawal Charge period. If the age or sex of the annuitant is misstated, then at annuitization, the annuity payments is adjusted to what the age or sex should have been had the correct age and/or sex been used.

The free look period varies by state. In most situations, the policy may be returned within 10 days after delivery of the policy. All premiums paid, less any partial surrenders, are refunded without penalty.

Policies are issued on a daily basis. The Issue Date is two working days after the date that the premium is paid. For 1035 exchange policies this is the date that the last funds are received at home office. The Issue Date does not have to be a date that the New York Stock Exchange (NYSE) is open (see above).

The starting S&P index value for 1035 exchange policies is the date funds are received. Normal rate guarantee procedures apply for BPA. The rate guarantee time period varies and is published with any new rate announcement. The rate guarantee applies from the date the application was signed. That means, for up to the number of days specified on the rate sheet, the allocation and the declared rate are the higher of the rates in effect (as) the date the application was signed or (b) the date funds were received at home office.

Shortly after each policy anniversary the usual annual statement is sent to the policy owner. A sample proposed annual statement is provided. This is a sample of an annual statement to be used before lock-in. The format of the after lock-in statement is developed based on the finalized pre lock-in statement.

This is a single premium plan. There are no further premiums allowed. The minimum premium is $5,000 for non-qualified and $2,000 for qualified. The maximum single premium is $1,000,000 (without prior Home Office approval).

Between anniversaries, the system provides the following information: Whether the client has elected an early lock-in for that Term; Current declared rate in effect (only if prior to early lock-in); Current guaranteed rate in effect (only if after early lock-in); Current S&P Index value and the S&P Index at the start of the current Term; Current Balanced Allocation Value; If prior to early lock-in, the information on how all the components were calculated is available in case a client wants to walk through the calculation; Current Accumulation Value; The Account Value if the client locked in today, and the resulting Cash Surrender Value; End of term Accumulation Value if locked in today; and, Maximum Free Partial Withdrawal amount available and the amount that will be deducted from the Accumulation Value for that withdrawal. Depending on systems capabilities some of that information may be available on-line or by telephone access to policyowners, or limited to the company's client service staff. The policy terminates at the earliest of full surrender, death (unless continued by a surviving spouse), or maturity.

The Cash Surrender Value is the Accumulation Value less the Withdrawal Charge and modified by the MVA, but it is never lower than the Minimum Guaranteed Contract Value. If the policy has not been locked-in prior to surrender then a lock-in is automatically triggered. The order of processing is described in more detail above.

Normal current company practice applies for benefits paid upon the death of the owner. The death benefit for the annuitant is greatest of: Balanced Allocation Value or Cash Surrender Value.

The annuitant must commence receiving income payments if the Contract is in force on the Annuity Date. The Annuity Date equals the anniversary immediately after the oldest annuitant's 100th birthday. The annuity value is the Cash Surrender Value. If the client has not yet elected an early lock-in for the current term, a lock-in is processed prior to annuitizing. Alternatively, the client can apply their Cash Surrender Value at any time to purchase an immediate annuity under the basis guaranteed in the contract. In some aspects, the Withdrawal Charges and MVA is waived: in years 2-5 the SPIA is for 8 years or longer; in years 6+ the SPIA is for 5 years or longer.

The policy includes company standard language for qualifying for the waiver of Withdrawal Charges and MVA upon confinement or terminal illness. The percentage payout has been increased such that the client can deplete 100% of the Accumulation Value without incurring any Withdrawal Charges or MVA. Any withdrawal under either waiver is processed just like a normal free partial withdrawal (i.e. it includes gains to date as described above). That means the client receives 100% of the Balanced Allocation Value if they deplete 100% of the Accumulation Value. The waiver is available at all ages.

Once sales volumes are sufficient, the company delivers a PC based "Hedge Inventory System", customized for the BPA design and needs of a specified entity. This may be used by the investment division of the company to monitor and manage the investment hedge relative to the product liability (the promises made to the product's policy holders). If the investment division decide to use this system then the following two new data feeds are required: Policy Administration Feed: feeds relevant rate information on each policy; this includes: specified rate table, term, issue date; and Investment Hedge Feed: feeds relevant information on the hedges purchased/sold for each block of business.

These feeds are be required for the initial product launch since a certain asset volume is required before the Hedge Inventory System becomes useful. This description only describes these new data feeds without mentioning the normal data feeds expected from and to the policy administration system.

The record layout below deals only with the policy administration feed. This involves a higher volume and requires automation. The investment feed depends on what hedging strategy is implemented. It also involves a much lower volume and in the past has been handled via a simple spreadsheet input. Thus, the definition and implementation can be delayed until volume requires a formal solution. One record is required per policy that is still within the Initial Term (and therefore indexed). All fields are based on current values as of the date that the file is created from the administration system.

Input is freeform with fields separated by blanks or tabs. If it is possible for the data to be uniform (columnar) then this would be preferable, but not essential, for ease of input into the hedging system. The fields listed below are examples of the fields that are required. The actual fields are determined once the customization process begins. (1) Product Type—this is a character code, such as BPA, identifying the product type. Whichever code is used internally by the administrative system of the company is usable. (2) Policy Number—this is an integer, such as 12345678, to uniquely identify the policy. (3) Starting Accumulation Value—this is a dollars and cents amount, such as 120000.00, which is the amount originally paid for the policy. (4) Date of Issue—this is the date in YYYYMMDD format, such as 20030131, that the policy was issued. (5) Maturity Date—this is the date in YYYYMMDD format, such as 20330131, that an income is assumed to be paid under the terms of the policy. For this design it will be age 95 of the annuitant. (6) Owner Sex #1—this is a single letter, one of M, F, or N (male, female, not a natural person) indicating the sex of owner #1 of the policy. This data may be required for calculation of the expected indexed interest credit on death. (7) Owner DOB #1—this is the date in YYYYMMDD format, such as 19391015, that owner #1 of the policy was born. (8) Owner Sex #2—this is a single letter, one of M, F, or N (male, female, not a natural person) indicating the sex of owner #1 of the policy. (9) Owner DOB #2—this is the date in YYYYMMDD format, such as 19391015, that owner #2 of the policy was born. (10) Annuitant Sex #1—this is a single letter, one of M, F, or N (male, female, not a natural person) indicating the sex of Annuitant #1 of the policy. This data may be required for calculation of the expected indexed interest credit on death. (11) Annuitant DOB #1—this is the date in YYYYMMDD format, such as 19391015, that Annuitant #1 of the policy was born. (12) Annuitant Sex #2—this is a single letter, one of M, F, or N (male, female, not a natural person) indicating the sex of Annuitant #1 of the policy. (13) Annuitant DOB #2—this is the date in YYYYMMDD format, such as 19391015, that Annuitant #2 of the policy was born. (14) Term Period—this is an integer, such as 48, indicating the number of months in each term. (15) Index Type—this is a five character code, such as SP500 or NASDQ, identifying the outside index to which the performance of the policy is tied. (16) Current Calculation Factors—the Calculation Factors for the current Term. (17) Minimum Calculation Factors—separate factors are needed for the second Term and the third Term. For each of these terms, the feed shows the guaranteed equity allocation percentage, and the guaranteed declared rate. (18) Surrender Scale—this is a six character code, such as DECL06, identifying the Withdrawal Charge scale used for the policy. (19) Maximum Annual FPW Rate—this is a percentage, such as 10.00, indicating the maximum annual free partial withdrawal rate under the policy. (20) Last Update—this is the date in YYYYMMDD format, such as 20030131, when the values included in the extract file were last updated. It may be convenient for valuation dates to coincide with update dates. (21) Index Value at Policy Issue—this is the value of the equity index, such as 850.00, that was in effect on the Date of Issue. (22) Minimum Guaranteed Contract Value at Issue—this is a dollars and cents amount, such as 108000.00, which is the Minimum Guaranteed Contract Value at issue. (23) Minimum Guaranteed Contract Value Interest Rate. This is the minimum guaranteed interest rate percentage to be credited to the Minimum Guaranteed Contract Value. (24) Accumulation Value at Start of Most Recent Policy Year—this is a dollars and cents amount, such as 120000.00, which is the Accumulation Value at the start of the most recent policy year. By policy year, we mean a policy year for a present invention product. (25) Minimum Guaranteed Contract Value at Start of Most Recent Policy Year—this is a dollars and cents amount, such as 108000.00, which is the Minimum Guaranteed Contract Value at the start of the most recent policy year. (26) Index at Start of Most Recent Policy Year—this is the value of the equity index, such as 850.00, that was in effect at the start of the most recent policy year. (27) Total Interest Credited—this is a dollar and cents amount, such as 10000.00, which is the total amount of interest ever credited to the policy. (28) Total Credits to the Minimum Guaranteed Contract Value—this is a dollar and cents amount, such as 10000.00, which is the total interest ever credited to the Minimum Guaranteed Contract Value.

At the start of each Term, the accumulation value is given an equity indexed allocation and a Declared Rate allocation declared by the company. The equity allocation has 100% participation in the S&P until the earlier of the lock-in date or the end of initial term, while the Declared Rate allocation participates in declared rate crediting. The client can request a lock-in once in each term. In each term, there is no credit until the earlier of the end of the term, or the date that the client requests a lock-in. If the client does not request a lock-in, then at the end of the term, they receive the combined total of 100% of the gain or loss in the S&P index applied on the equity allocation, plus the compounded declared rate earnings on the Declared Rate allocation, subject to a floor of zero. If client requests a lock-in prior to the end of the term, then at that time, the accumulation value receives a pro-rata portion of the gain on the equity allocation, plus the compounded declared rate earnings to date on the Declared Rate allocation. The accumulation value then earns guaranteed interest for the remainder of the term, using a rate determined at lock-in, as described below.

The Stock Index used is the S&P 500 Composite Price Index (does not include dividends). The Percentage Increase in S&P is calculated by comparing Equity Index Ending Value for the lock-in date to the S&P index at the start of the term. At the end of the term, the Equity Index Ending Value is the average of the S&P 500 values during all business days during the last 30 calendar days of the term. On the date of death or lock-in prior to the end of the term, the Equity Index Ending Value is equal to the S&P Value on that day (or if that day not a business day, then on the previous business day).

The Calculation Factors for each term are set by the company at the start of that term, and are guaranteed for the entire term. The Calculation Factors are: the Equity Indexed Allocation; the Declared Rate Allocation (equal to 100% minus the Equity Allocation); the Declared rate; and, the Asset Expense Charge Rate (currently 0).

Equity Indexed Allocation is the proportion of the accumulation value for which earnings depend on the performance of the equity index up to end of the term, or the lock-in date if earlier. Pricing solves for a combination of Declared Rate allocation and equity indexed allocation that the company can credit while achieving target profitability. Declared Rate Allocation is the proportion of the accumulation value for which earnings depend on the declared rate.

For each future term which begins prior to the end of the surrender charge period, the following minimum Renewal Calculation Factors are guaranteed: Equity Allocation: 20%; Declared rate: 1.5% for 12-year design, 1% for 8-year design. The Asset Expense Charge Rate is the same level as at issue.

Once in each term, the client can elect to "lock in" indexed gains at any time during that term. After the lock-in, the Accumulation Value earns daily interest for the rest of the term. In determining the amount of interest to be credited, the following is defined for time t, where t is the time since the start of the term: $AV_t$ is the Accumulation Value at time t, prior to any index credits. $A_t$ is the Equity-Related Earnings, and is equal to: the equity allocation percentage; times the percentage increase in the S&P (as defined above) at time t; times the pro-rata factor for time t. $B_t$ is Declared Rate Earnings, and is equal to: the Declared Rate allocation percentage; times $(1+\text{Declared rate})^t - 1$. $C_t$ is the Death Benefit Rider Premium, and is equal to: the total annual premium rate for any riders attached to BPA; times the number of years in the Elapsed Term for that date, or if less, the number of years between the start of the Term, and the Rider Premium Completion Date. $D_t$ is the Asset Expense Charge, and is equal to: the asset expense charge rate; times the number of years in the Elapsed Term for that date.

At any time t, the Index Earnings Factor equals the sum of: $A_t$ plus $B_t$ minus $C_t$ minus $D_t$. The pro-rata factor used in item A is defined to be: the elapsed days since the start of the initial term; divided by the total days in the initial term.

At any time t, if a lock-in for the current term has not been elected, the Balanced Allocation Factor equals the sum of: $A_t$ plus $B_t$ minus $C_t$ minus $D_t$. It is the same as the Index earnings factor except that the pro-rata factor is defined to be 1. If a lock-in has already been elected, the Balanced Allocation Factor is zero.

If no lock-in, then the Accumulation Value receives interest at the end of the term equal to the Accumulation Value times the combined equity indexed gain or loss on the equity-allocation, and declared rate earnings on the Declared Rate allocation. The formula for the index credit is: $AV_{end\ of\ term}$ times the Index earnings factor: In the special case where the index credit is paid at the end of the term, the pro-rata factor is 1, and the elapsed term is 4 years, and the Index earnings factor equals the sum of: $A_{end\ of\ term}$ plus $B_{end\ of\ term}$ minus $C_{end\ of\ term}$ minus $D_{end\ of\ term}$, but not less than zero.

If lock-in at time t, then the equity index gains are locked in on the equity allocation, and the accumulation value receives interest credited immediately based on a pro-rata share of the equity index gains as well as all declared rate earnings accrued to date on the declared rate portion. The formula is: $AV_t$ times the Index earnings factor, where the Index earnings factor equals the sum of: $A_t$ plus $B_t$ minus $C_t$ minus D.

Between the lock-in date and the end of the initial term, the accumulation value acts like a regular SPDA and earns daily interest at the "guaranteed rate". The guaranteed rate is calculated at the time of lock-in and is guaranteed for the remainder of the term. The guaranteed rate is determined so that at the end of the term, the accumulation value equals the accumulation value immediately prior to lock-in, plus the equity related earnings (without any pro-rata adjustment) calculated at lock-in, plus declared rate earnings for the entire term.

The guaranteed rate, g, is solved such that the following formulas provide the same result, where RT is the time remaining in the term.

$$(AV_t \times (1+A_{end\ of\ term}+B_{end\ of\ term}-C_{end\ of\ term}-D_{end\ of\ term}))$$

$$(AV_t \times (1+A_t+B_t-C_t-D_t) \times (1+g)^{RT}$$

Therefore g is equal to:

$$[(1+A_{end\ of\ term}+B_{end\ of\ term}-C_{end\ of\ term}-D_{end\ of\ term})/(1+A_t+B_t-C_t-D_t)]^{(1/RT)}-1$$

In all cases the pro-rata factor used in calculation A equals the elapsed days since the start of the initial term; divided by the total days in the initial term.

The Accumulation value at any time is equal to: the Accumulation value at start of term (or the premium at the start of the first term), less withdrawals plus earnings. Before lock-in there are no increases to the Accumulation value for that term. If the client (the entity holding BPA) selects to lock-in, then, for that term, there is an immediate earnings credit to the Accumulation value on the lock-in date. After lock-in the Accumulation value earns daily interest for the remainder of that term (see description of lock-in for formulas). If there is no lock-in for a term, then the Accumulation value will receive one lump sum earnings credit at the end of that term.

The Cash Surrender Value is the greater of: Accumulation Value less surrender charge adjusted by market value adjustment (MVA); and Minimum Guaranteed Contract Value (with no MVA). The Minimum Guaranteed Contract Value is: 87.5% of first year premium less withdrawals, all accumulated at X % interest, where X is set to satisfy the nonforfeiture law, and any marketing concerns. There is no Market Value Adjustment applied to the Minimum guaranteed value.

The Withdrawal Charge for the 12-year design is: 13.5/13/12.5/12/11/10/9/8/7/6/5/3/0% of amount withdrawn in excess of the free withdrawal amount. The Withdrawal Charge for the 8-year design: 10/9/8/7/6/5/4/3% of amount withdrawn in excess of the free withdrawal amount. However, it should be understood that the present invention is not limited to the preceding designs and Withdrawal Charges and that other designs and Withdrawal Charges are included in the spirit and scope of the claimed invention.

The market value applies during the Surrender Charge Period only. It is applied to the surrender value or partial withdrawal amount. However, it is not applied to free withdrawals. It is not applied to the Minimum Guaranteed Contract Value. In general, the regular MVA formula is followed, except that there is no component related to the Accumulation Value Floor.

The MVA is calculated as follows:

$$50\% \times (a-b-0.25\%) \times n/12$$

where:
"a" is the 10-year Treasury Rate at the start of the term.
"b" is the 10-year Treasury Rate on the calculation date.
"n" is the number of months remaining before the expiration of the surrender charge period.

A positive MVA cannot exceed the surrender charge. A negative MVA cannot exceed the lifetime investment income to date.

In any policy year, the amount of cash received under a free withdrawal is limited to 10% of the Accumulation Value at the time of the first withdrawal in a year. Standard industry practice is to use 10% of the accumulation value at the start of each year. In some aspects the time of the first withdrawal is changed, so that if a client locks in part way through a year and receive index credits, they can then access 10% of the accumulation value including those index credits.

The amount deducted from the accumulation value to pay for a free withdrawal equals the actual cash payment, divided by (1+Balanced Allocation Factor at time t). In other words, if the client makes a withdrawal prior to lock-in, the client receives the full in force gain on the amount deducted from the accumulation value.

As is standard industry practice, there are also free withdrawals for confinement and terminal illness. Again for these free withdrawals, the amount deducted from the accumulation value equals the amount paid the client divided by (1+Balanced Allocation Factor). No MVA or Surrender Charge applies to free withdrawals.

The death benefit is equal to the greater of the Cash Surrender Value at time of death (including any MVA), and the Balanced Allocation Value (with no MVA). The Balanced Allocation Value equals the Accumulation Value times (1+Balanced Allocation Factor).

Annuitization occurs on the maturity date. In some aspects, the maturity date is fixed at age 100. The annuity value is the Cash Surrender Value. In some aspects, the Withdrawal Charges and MVA will be waived if the client purchases a SPIA within the following guidelines: in years 2-5 the SPIA must be for 8 years or longer; in years 6+ the SPIA must be for 5 years or longer.

The policy includes a modification from normal industry practice for confinement and terminal illness. The normal industry definitions are used. Two changes are made. First, the percentage payout has been increased such that the client can deplete 100% of the Accumulation Value without incurring any Withdrawal Charges or MVA. Any withdrawal under either waiver is processed just like a normal free partial withdrawal (i.e. it includes gains to date). That means the client receives 100% of the Balanced Allocation Value if they deplete 100% of the Accumulation Value. Second, the waiver is now available at all ages.

When a death benefit is paid, the beneficiary receives the greater of actual death benefit under the annuity, and the Enhanced Guaranteed Minimum Death Benefit calculated on the same date as the regular death benefit, where the Enhanced Guaranteed Minimum Death Benefit is equal to the premium accumulated at R % until the rider premium completion date, adjusted for withdrawals.

At issue, the Enhanced Guaranteed Minimum Death Benefit is equal to the premium. Thereafter, it increases daily at the Enhanced Guarantee Minimum Death Benefit Rate of R %, until the Enhanced Guarantee Minimum Completion Date. After that point, the Benefit no longer increases. The Value of R is determined based on finalized pricing. In some aspects, R is lower for the 8-year design than the 12-year design.

The Enhanced Guarantee Minimum Death Benefit is reduced on a pro-rata basis for partial withdrawals. For example, if 10% of accumulation value is taken out, then the rollup death benefit is reduced by 10%. The Enhanced Guarantee Minimum Death Benefit Completion Date is the anniversary following attained age 90. The annual rider premium is payable until the Rider Premium Completion Date. Although the Rollup Death Benefit stops increasing after the Death Benefit Completion Date, it is still paid out if higher than the regular annuity death benefit.

In some aspects, the rider premium is 0.50% per year. The premium is charged at the same time that interest is credited to the accumulation value. The premium is shown above as item C of the Index earnings factor. If a client does not elect lock-in during a term, then at the end of the term, the credited is reduced by the Accumulation value times the rider premium, for example 0.50% per year, times the number of years in the term (or if less, the time between the start of the term and the Rider Premium Completion Date). However, the resulting credit cannot be less than zero.

If a client elects lock-in during a term, then at that time, the resulting credit is reduced by the rider premium, for example 0.50%, times the number of full years plus a fraction for the partial year since the start of the term. (or if less, the time between the start of the term and the Rider Premium Completion Date) As well, when calculating the guaranteed rate g, the end-of-term benefit is reduced by the premium times the number of years in the term. The rider cannot be dropped after it is elected. Premiums must be paid through the Rider Completion Date.

Thus, it is seen that the objects of the present invention are efficiently obtained, although modifications and changes to the invention should be readily apparent to those having ordinary skill in the art, which modifications are intended to be within the spirit and scope of the invention as claimed. It also is understood that the foregoing description is illustrative of the present invention and should not be considered as limiting. Therefore, other embodiments of the present invention are possible without departing from the spirit and scope of the present invention.

What we claim is:

1. A computer-based method for determining a set of equity-indexed crediting parameters C for a selectable-term equity-indexed deposit product also having a set of profitability requirements R, a principal amount P, an account value A, a maximum term T, a set of lock-in formulas F, a selected term T', an immediate credit I, and a guaranteed rate G, with R, P, A, T, C, and F determined at the time of product purchase and T'<=T determined by the purchaser after the time of purchase and I and G determined by the seller at T' according to the set of formulas F, with the immediate credit I being added to the account value A at time T' and interest being credited to the account value A at the rate G from time T' to time T, comprising, using a processor in at least one specially programmed computer:
   generating a set of yield curve and equity index scenarios consistent with valuation parameters;
   generating a set of values for T', one for each yield curve and equity index scenario in the set of yield curve and equity index scenarios;
   setting a trial value $C_i$ for the set of equity-indexed crediting parameters C for said selectable-term equity-indexed deposit product;
   calculating values for I and G for each yield curve and equity index scenario in the set of yield curve and equity index scenarios;
   calculating the observed distribution D of profitability using said yield curve and equity index scenarios in the set of yield curve and equity index scenarios;
   comparing D with R; and,
   based on the comparison of D with R, computing a revised trial value $C_{i+1}$ for the set of equity-indexed crediting parameters C for said selectable-term equity-indexed deposit product to determine values of the immediate credit I and the guaranteed rate G that achieves the profitability requirements R according to the set of lock-in formulas F, wherein the set of lock-in formulas F determine a value of the guaranteed rate G at a time T' when lock-in is initiated, said lock-in indicates to credit interest to the account value A at the rate G from time T' to time T, wherein the set of lock-in formulas F include the following parameters: equity indexed allocation earnings, declared rate allocation earnings, a rider premium charge, an asset expense charge based on the account value of the policy, and time remaining in the term.

2. The computer-based method recited in claim 1, further comprising:
   specifying, using the processor, a point-to-point equity index credit by said set of equity-indexed crediting parameters C; and,
   calculating, using the processor, said equity index credit using a percentage of an increase in an equity index, credited at the end of each policy year such that said equity index credit is no less than an annual minimum value.

3. The computer-based method recited in claim 1, further comprising:
   specifying, using the processor, a point-to-point equity index credit by said set of equity-indexed crediting parameters C; and,
   calculating, using the processor, said equity index credit using a percentage of an increase in an equity index, credited at the end of each policy year such that said equity index credit is no less than an annual minimum value and said equity index credit is no greater than an annual maximum value.

4. The computer-based method recited in claim 1, further comprising:
   specifying, using the processor, a point-to-average equity index credit by said set of equity-indexed crediting parameters C; and,
   calculating, using the processor, said equity index credit using a percentage of an increase in an equity index from a year-start value to an average of values over a policy year, credited at the end of each policy year such that said equity index credit is no less than an annual minimum value.

5. The computer-based method recited in claim 1, further comprising:
- specifying, using the processor, a point-to-average equity index credit by said set of equity-indexed crediting parameters C; and,
- calculating, using the processor, said equity index credit using a percentage of an increase in an equity index from a year-start value to an average of values over a policy year, credited at the end of each policy year such that said equity index credit is no less than an annual minimum value and said equity index credit is no greater than an annual maximum value.

6. The computer-based method as described in claim 1, further comprising:
- specifying, using the processor, a point-to-point equity index credit by said set of equity-indexed crediting parameters C; and,
- calculating, using the processor, said equity index credit using a percentage of an increase in an equity index, credited at the end of an index interval equal to an integral number N of policy years such that said equity index credit is no less than a minimum value calculated during said index interval.

7. The computer-based method as described in claim 1, further comprising:
- specifying, using the processor, a point-to-point equity index credit by said set of equity-indexed crediting parameters C; and,
- calculating, using the processor, said equity index credit using a percentage of an increase in an equity index, credited at the end of an index interval equal to an integral number N of policy years such that said equity index credit is no less than a minimum value and said equity index credit is no greater than a maximum value calculated during said index interval.

8. The computer-based method as described in claim 1, further comprising:
- specifying, using the processor, a point-to-average equity index credit by said set of equity-indexed crediting parameters C; and,
- calculating, using the processor, said equity index credit using a percentage of an increase in an equity index from a year-start value to an average of values over an index interval equal to an integral number N of policy years, credited at the end of said index interval such that said equity index credit is no less than a minimum value calculated during said index interval.

9. The computer-based method as described in claim 1, further comprising:
- specifying, using the processor, a point-to-average equity index credit by said set of equity-indexed crediting parameters C; and,
- calculating, using the processor, said equity index credit using a percentage of increase in an equity index from a starting value to an average of values over an index interval equal to an integral number N of policy years, credited at the end of said index interval such that said equity index credit is no less than a minimum value and said equity index credit is no greater than a maximum value calculated during said index interval.

10. The computer-based method recited in claim 1, further comprising:
- specifying, using the processor, a point-to-point equity index credit by said set of equity-indexed crediting parameters C; and,
- calculating, using the processor, said equity index credit using a weighted sum, said weighted sum adding a compounded value calculated using a declared rate to a percentage of change in an equity index, such that said equity index credit is credited at the end of an index interval equal to an integral number N of policy years and said equity index credit is no less than a minimum value during said index interval.

11. The computer-based method recited in claim 1, further comprising:
- specifying, using the processor, a point-to-point equity index credit by said set of equity-indexed crediting parameters C; and,
- calculating, using the processor, said credit using a weighted sum, said weighted sum adding a compounded value calculated using a declared rate to a percentage of change in an equity index, such that said equity index credit is credited at the end of an index interval equal to an integral number N of policy years, said equity index credit is no less than a minimum value, and said equity index credit is no greater than a maximum value during said index interval.

12. The computer-based method recited in claim 1, further comprising:
- specifying, using the processor, a point-to-average equity index credit by said set of equity-indexed crediting parameters C; and,
- calculating, using the processor, said credit using a weighted sum, said weighted sum adding a compounded value calculated using a declared rate to a percentage of change in an equity index from a starting value to an average of values over an index interval equal to an integral number N of policy years such that said equity index credit is credited at the end of said index interval, and said credit is no less than a minimum value during said index interval.

13. The computer-based method recited in claim 1, further comprising:
- specifying, using the processor, a point-to-average equity index credit by said set of equity-indexed crediting parameters C; and,
- calculating, using the processor, said equity index credit using a weighted sum, said weighted sum adding a compounded value calculated using a declared rate to a percentage of change in an equity index from a starting value to an average of values over an index interval equal to an integral number N of policy years such that said equity index credit is credited at the end of said index interval, said equity index credit is no less than a minimum value, and said equity index credit is no greater than a maximum value during said index interval.

14. A computerized method of administering an equity indexed product with an early lock-in provision, the equity indexed product having an account value, said computerized method comprising the steps of:
- defining a term of said equity indexed product;
- declaring an equity indexed allocation percentage for said product;
- declaring a declared rate allocation percentage for said product;
- calculating with a computer, an initial value of said equity indexed product based in part on said equity indexed allocation percentage and said declared rate allocation percentage;
- determining whether during said term, said early lock-in provision is initiated one or more times, and if so, determining one or more dates of initiation and a lock-in percentage for each said date of initiation;

defining each said date of initiation as a lock-in date;
calculating an index earning factor on each said lock-in date, said index earning factor equal to a sum of:
(i) declared rate earnings based in part on said declared rate allocation percentage, and
(ii) equity index earnings multiplied by said lock-in percentage associated with said lock-in date, said equity index earnings based in part on said equity indexed allocation percentage; and
crediting said account value of said equity indexed product with the sum of said index earnings factors only if the sum of said index earnings factors is greater than zero.

15. The invention of claim 14, further comprising the step of:
crediting a portion of said account value from each said lock-in date to a last day of said term based on a guaranteed interest rate associated with each said lock-in date.

16. The invention of claim 15, further comprising calculating the guaranteed interest rate (g) for a remainder of the term such that $$g = \left[\frac{(1 + A_t + B_{end} - C_{end} - D_{end})}{(1 + A_t + B_t - C_t - D_t)}\right]^{\left(\frac{1}{RT}\right)} - 1$$

where $A_t$ is equity indexed earnings between a beginning of the term and said lock-in date, $B_t$ is a declared rate earnings between a beginning of the term and said lock-in date, $B_{end}$ is a declared rate earnings at an end of the term, $C_t$ is a rider premium charge between a beginning of the term and said lock-in date, $C_{end}$ is a rider premium charge at an end of the term, $D_t$ is an asset expense charge between a beginning of the term and said lock-in date, $D_{end}$ is an asset expense charge at an end of the term, and RT is a remaining time in the term.

17. The invention of claim 15, wherein each said guaranteed interest rate comprises a pro-rata portion of an equity index gain.

18. The invention of claim 17, further comprising the step of:
determining each said guaranteed interest rate on each said lock-in date.

19. The invention of claim 15, wherein each said guaranteed interest rate is determined based on guaranteed interest earnings that comprise a sum of (i) the declared rate earnings, and (ii) a pro-rata portion of an equity index gain.

20. The invention of claim 14, wherein said equity indexed product comprises an equity indexed annuity.

21. The invention of claim 14, wherein said term comprises a point-to-point indexing term.

22. The invention of claim 14, wherein the equity indexed product is configured to include an owner initiated lock-in provision.

23. The invention of claim 14, wherein said term comprises a four year term.

24. The invention of claim 14, further comprising the steps of:
determining during said term that said early lock-in provision is not initiated;
determining a last day of said term;
defining an end of term date as said last day of said term;
calculating an index earnings factor on said end of term date, said index earning factor equal to a sum of:
declared rate earnings based in part on said declared rate allocation percentage, and
equity index earnings based in part on said equity indexed allocation percentage; and
crediting said account value of said equity indexed product with said index earnings factor.

25. A computerized method of administering an equity indexed product with an early lock-in provision, the equity indexed product having an account value, said computerized method comprising the steps of:
defining a term of said equity indexed product;
declaring an equity indexed allocation percentage for said product;
declaring a declared rate allocation percentage for said product;
calculating with a computer, an initial value of said equity indexed product based in part on said equity indexed allocation percentage and said declared rate allocation percentage;
determining whether during said term, said early lock-in provision is initiated one or more times, and if so, determining one or more dates of initiation and a lock-in percentage for each said date of initiation;
defining each said date of initiation as a lock-in date;
calculating an index earning factor on each said lock-in date, said index earning factor (F) equal to F=(A+B)−(C+D), where:
A=a product of (i) the equity indexed allocation percentage, (ii) a change in an equity index, and (iii) a time since a start of the term divided by a total length of the term,
B=a product of (i) the declared rate allocation percentage, and (ii) a declared rate compounded from a start of the term to said lock-in date,
C=a product of (i) an annual percentage cost of a rider attached to the equity indexed product and (ii) an elapsed time of the term,
D=a product of (i) an asset expense charge rate and (ii) an elapsed time of the term, and
crediting said account value of said equity indexed product with the sum of said index earnings factors only if the sum of said index earnings factors is greater than zero.

* * * * *